United States Patent
Someya et al.

(10) Patent No.: US 6,339,452 B1
(45) Date of Patent: Jan. 15, 2002

(54) IMAGE DISPLAY DEVICE AND IMAGE DISPLAYING METHOD

(75) Inventors: Jun Someya; Yoshiaki Okuno, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/393,192

(22) Filed: Sep. 10, 1999

(30) Foreign Application Priority Data

Sep. 11, 1998 (JP) .......................................... 10-258519

(51) Int. Cl.⁷ ................................................ H04N 9/74
(52) U.S. Cl. ....................................... 348/581; 348/563
(58) Field of Search ................................. 348/581, 704, 348/563, 561; 345/127; H04N 3/223, 9/74

(56) References Cited

U.S. PATENT DOCUMENTS 5,874,937 A * 2/1999 Kesatoshi .................... 345/127

OTHER PUBLICATIONS

Minoru et al., Image Signal Conversion Device, Apr. 4, 1997, abstract of Japanese Laid–Open Publication No. Hei 9–090920.

Kesatoshi, Takeuchi, Video Scaling Device, May 2, 1997, abstract of Japanese Laid–Open Publication No. Hei–9–114443.

* cited by examiner

*Primary Examiner*—Sherrie Hsia

(57) ABSTRACT

According to an inventive image display device and an image displaying method thereof, a frequency of a synchronizing signal of an image signal is discriminated whether or not it is higher than a preset frequency, the image signal is reduced and outputted based on the discrimination result and an image corresponding to the reduced and outputted image signal is displayed, so that it is possible to reset the frequency of synchronizing signal readily while watching a screen of the display unit even if the synchronizing signal has such high frequency that the image cannot be displayed on the display unit.

20 Claims, 16 Drawing Sheets

IMAGE DISPLAY DEVICE AND IMAGE DISPLAYING METHOD

BACKGROUND OF THE INVENTION

1. Field of the Invention

The present invention relates to an image display device and an image displaying method and more specifically to an image display device, and an image displaying method thereof, such as a monitor and a data projector comprising a matrix type display device (hereinafter referred to simply as a display panel) such as a liquid crystal panel, a digital mirror device (DMD) and a field emission display (FED) to which any one of a plurality of image signals whose synchronizing signal frequency is different is inputted.

2. Description of the Related Art

FIG. 1 is a diagram showing a conventional image display device. In the figure, the image display device comprises an image signal inputting terminal 1, an A/D converter 2, a display panel 4, a horizontal synchronizing signal inputting terminal 5, a vertical synchronizing signal inputting terminal 6, a clock generator 9, an image signal processing circuit 103 and a driving circuit 110. The reference symbol (HD) denotes a horizontal synchronizing signal, (VD) a vertical synchronizing signal, (CK) a clock signal and (DS1) a signal for driving the display panel 4.

An operation the unit will be explained below. In the same time when the horizontal synchronizing signal HD is inputted to the horizontal synchronizing signal inputting terminal 5, the vertical synchronizing signal VD is inputted to the vertical synchronizing signal inputting terminal 6. An image signal synchronized with the horizontal synchronizing signal HD and the vertical synchronizing signal VD is inputted to the image signal inputting terminal 1.

The clock generator 9 generates the clock CK of a predetermined frequency based on the horizontal synchronizing signal HD inputted from the horizontal synchronizing signal inputting terminal 5. The clock CK generated by the clock generator 9 is supplied to the A/D converter 2, the image signal processing circuit 103 and the driving circuit 110.

The A/D converter 2 samples the image signal inputted from the image signal inputting terminal 1 with timing of the clock CK to convert into digital image data.

The digital image data Di converted by the A/D converter 2 is inputted to the image signal processing circuit 103 to undergo a certain image signal processing. The digital image data Di processed by the image signal processing circuit 103 is inputted to the display panel 4.

Meanwhile, the driving circuit 110 generates the driving signal DS1 for driving the display panel 4 based on the horizontal synchronizing signal HD inputted from the horizontal synchronizing signal inputting terminal 5 and the vertical synchronizing signal VD inputted from the vertical synchronizing signal inputting terminal 6.

The display panel 4 displays an image of the image data outputted from the image signal processing circuit 103 based on the driving signal DS1 outputted from the driving circuit 110.

Because the conventional image display device has been constructed as described above, there has been a problem that the image cannot be displayed normally on the display panel 4, or the display is so disturbed that an user is unable to recognize the type of the inputted image, when the frequency of the inputted horizontal synchronizing signal HD is higher than a predetermined frequency which enables to display on the display panel 4. Therefore, the frequency of the horizontal synchronizing signal of the inputted image signal cannot be changed to the frequency which enables to display on the display panel 4 while watching the image displayed on the display panel 4.

More specifically, there has been a problem that when the horizontal frequency of synchronizing signal is erroneously set at a frequency higher than the horizontal frequency of synchronizing signal which enables to display on the image display device in changing resolution of the image or refresh rate by a personal computer connected to the display device, it has been impossible to return the frequency to one before the change or to reset to the frequency or below which enables to display on the display panel 4 while watching the screen because no image is displayed on the display panel 4 or the display is so disturbed that the image cannot be recognized after when the setting has been changed.

SUMMARY OF THE INVENTION

Accordingly, it is an object of the invention to solve the above-mentioned problems by providing an image display device, and an image displaying method thereof, which enables to confirm what type of image signal is being inputted and to display an image to a degree which enables to reset the horizontal (or vertical) frequency of synchronizing signal readily to the optimum frequency even when an image signal of horizontal (or vertical) frequency of synchronizing signal which cannot be displayed on a display panel is inputted.

The invention provides an image display device comprising a clock generator for generating clock having a frequency and phase based on a synchronizing signal of an image signal; an A/D converter for sampling the image signal with the clock to convert into a digital image signal; synchronizing frequency discriminating means for discriminating whether or not the synchronizing signal has a frequency higher than a preset frequency; synchronizing signal processing means for reducing the synchronizing signal based on the discrimination result of the synchronizing frequency discriminating means and outputting a modified synchronizing signal; image signal processing means for reducing the digital image signal on the basis of the modified synchronizing signal to output a reduced digital image signal; and a display unit for displaying an image corresponding to the reduced digital image signal outputted from the image signal processing means.

The invention also provides an image display device comprising a clock generator for generating clock having a frequency and phase based on a synchronizing signal of an image signal; and A/D converter for sampling the image signal with the clock to convert into a digital image signal; synchronizing frequency discriminating means for discriminating whether or not the synchronizing signal has a frequency higher than a preset frequency; synchronizing signal processing means for reducing a horizontal synchronizing signal by removing its portions corresponding to either one of odd or even lines in an n-th field (n is a positive integer) and the other one of the odd or even lines in an n+1-th field based on the discrimination result of the synchronizing frequency discriminating means and outputting a modified synchronizing signal; a memory capsule of storing data of at least one field of the digital image signal; image signal processing means for reducing the digital image signal on the basis of said modified synchronizing signal to write, into the memory, a reduced signal corresponding to the n-th field and a reduced signal corresponding to the n+1-th field and for reading out the reduced signals stored in the memory in predetermined order of lines to combine the reduced signals to obtain a combined digital image signal, and for outputting the combined digital image signal; and a display unit for displaying an image corresponding to the composed digital image signal outputted from the image signal processing means.

The invention also provides an image displaying method for displaying an image on a display unit comprising steps of discriminating whether or not a synchronizing signal of the image signal has a frequency higher than a preset frequency; reducing the image signal based on the discrimination result to output a reduced image signal; and displaying an image corresponding to the reduced image signal on the display unit.

The other objects and features of this invention will become understood from the following description with reference to the accompanying drawings.

DETAILED DESCRIPTION OF THE PREFERRED EMBODIMENTS

The preferred embodiments of the present invention will now be described.

First Embodiment

Figure 1:
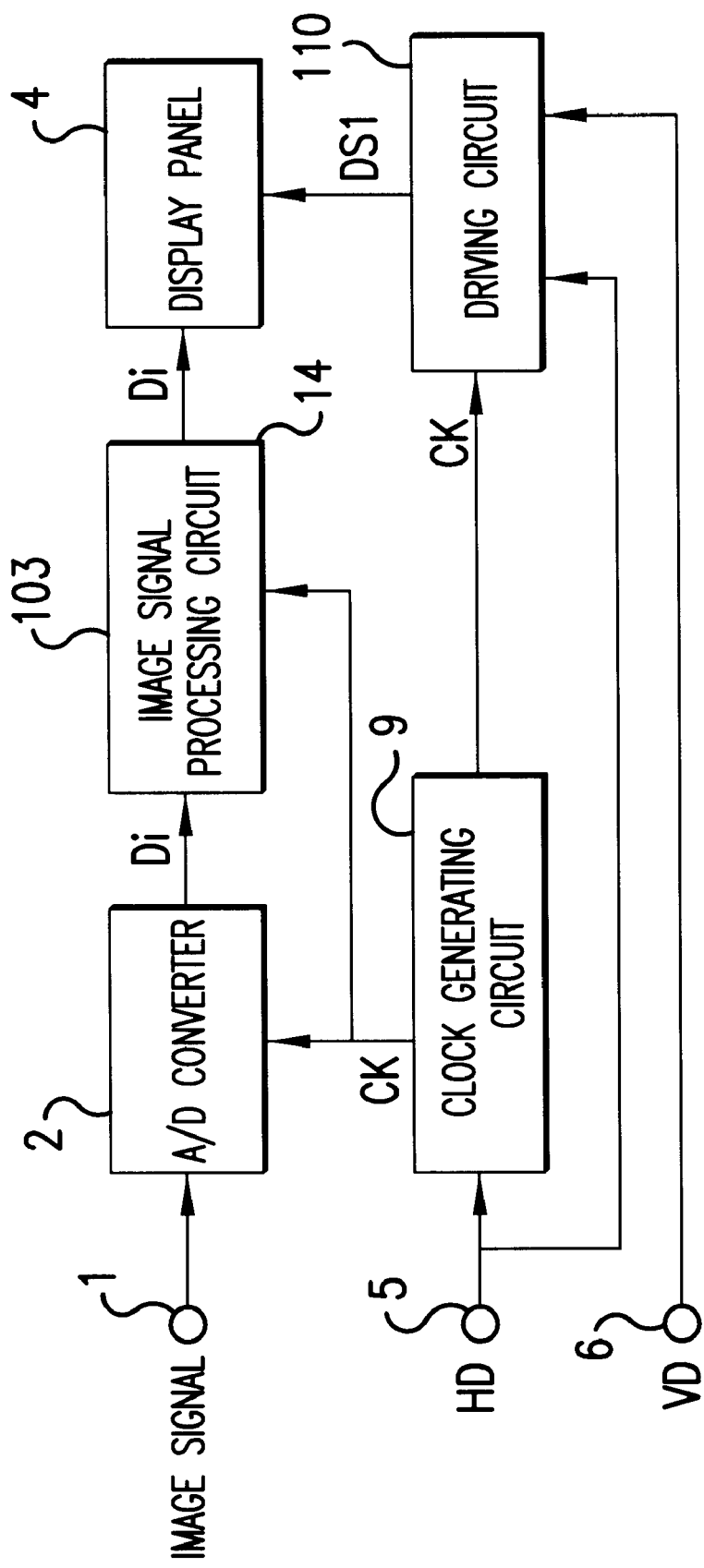
FIG. 1 is a block diagram showing the structure of a prior art image display device.
Figure 2:
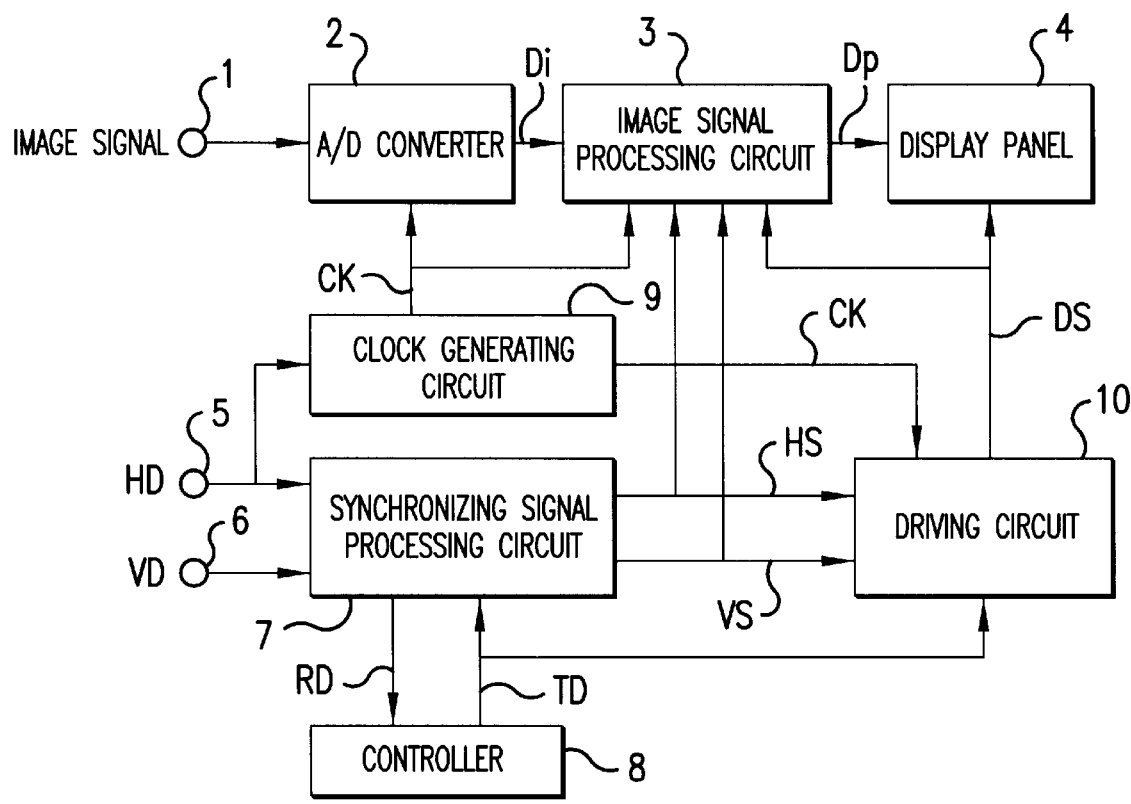
FIG. 2 is a block diagram showing the structure of an image display device according to a first embodiment of the invention.

FIG. 2 is a block diagram showing the structure of an image display device according to a first embodiment of the invention.

In the figure, the image display device comprises an image signal input terminal 1, an A/D converter 2, an image signal processing circuit 3, a display panel 4, a horizontal synchronizing signal inputting terminal 5, a vertical synchronizing signal inputting terminal 6, a synchronizing signal processing circuit 7, a controller 8, a clock generator 9 and a driving circuit 10. The reference symbol (HD) denotes an inputted horizontal synchronizing signal, (VD) an inputted vertical synchronizing signal, (CK) a clock signal generated by the clock generator 9, (HS) a horizontal synchronizing signal processed by the synchronizing signal processing circuit 7, (VS) a vertical synchronizing signal processed by the synchronizing signal processing circuit 7, (Di) digital image data sampled by the A/D converter 2, (Dp) image data processed by the image signal processing circuit 3, (DS) a driving signal of the display panel 4, and (TD) a control signal.

It is noted that (RD) is data such as a result of measured frequency of the synchronizing signal, generated by the synchronizing signal processing circuit 7, which will be detailed later.

Figure 3:
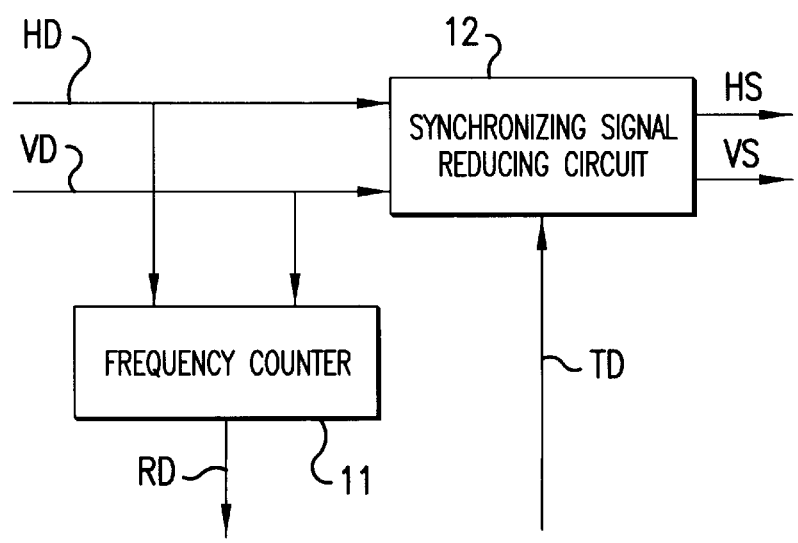
FIG. 3 is a block diagram showing a synchronizing signal processing circuit according to the first embodiment.

FIG. 3 is a block diagram detailing the synchronizing signal processing circuit 7 of the first embodiment. In FIG. 3, the reference numeral (11) denotes a frequency counter, (12) a synchronizing signal reducing circuit, and (RD) the frequency measured result.

Figure 4:
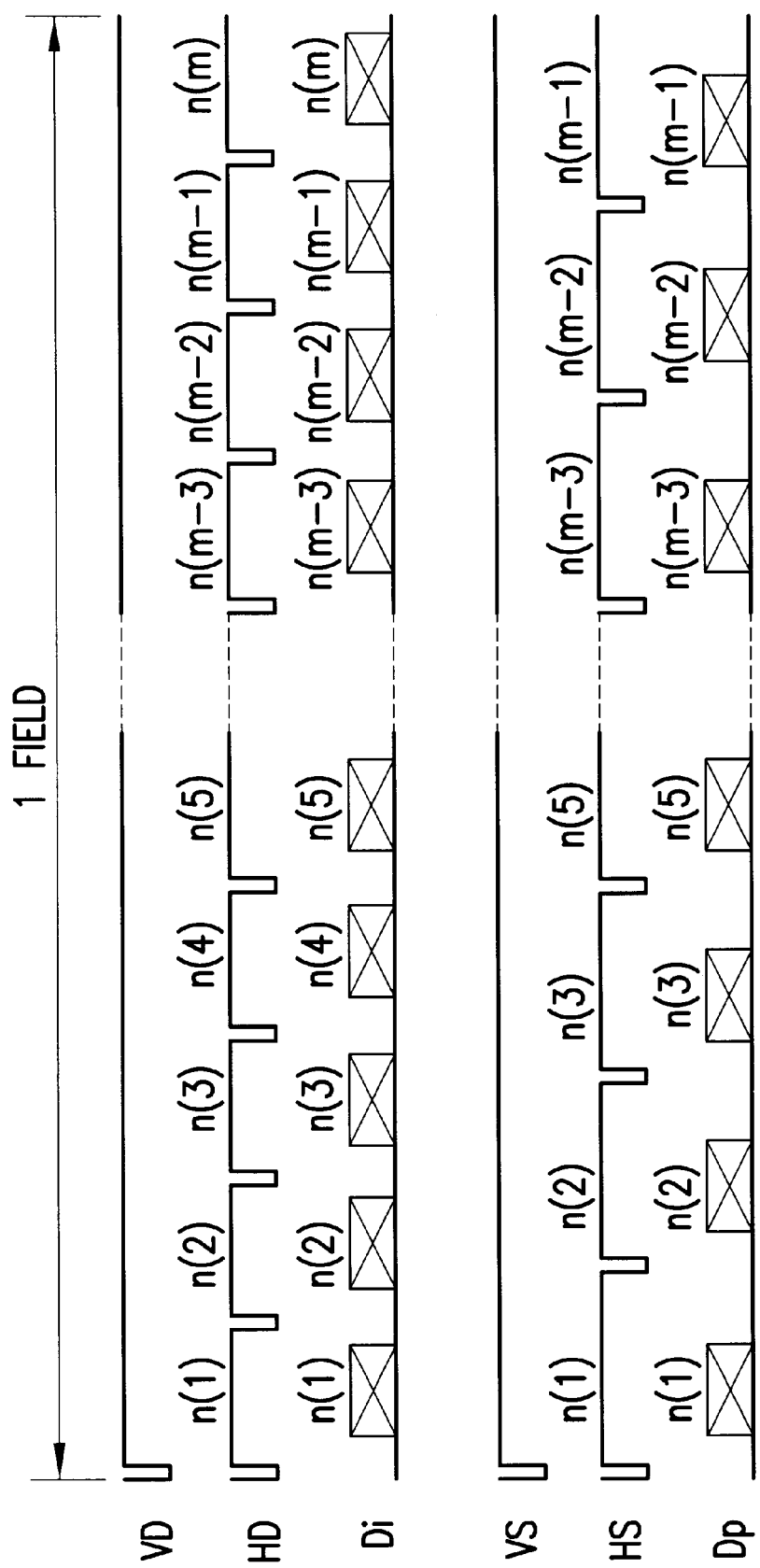
FIG. 4 is a chart for explaining a process for reducing a synchronizing signal and an image signal according to the first embodiment.

FIG. 4 is a chart showing operations of the synchronizing signal processing circuit 7 and the image signal processing circuit 3 in a period of one field according to the first embodiment.

In FIG. 4, n(l) through n(m) denote line numbers of an inputted image signal at an arbitrary field. For instance, n(m) denotes a m-th line in an n-th field.

Figure 5:
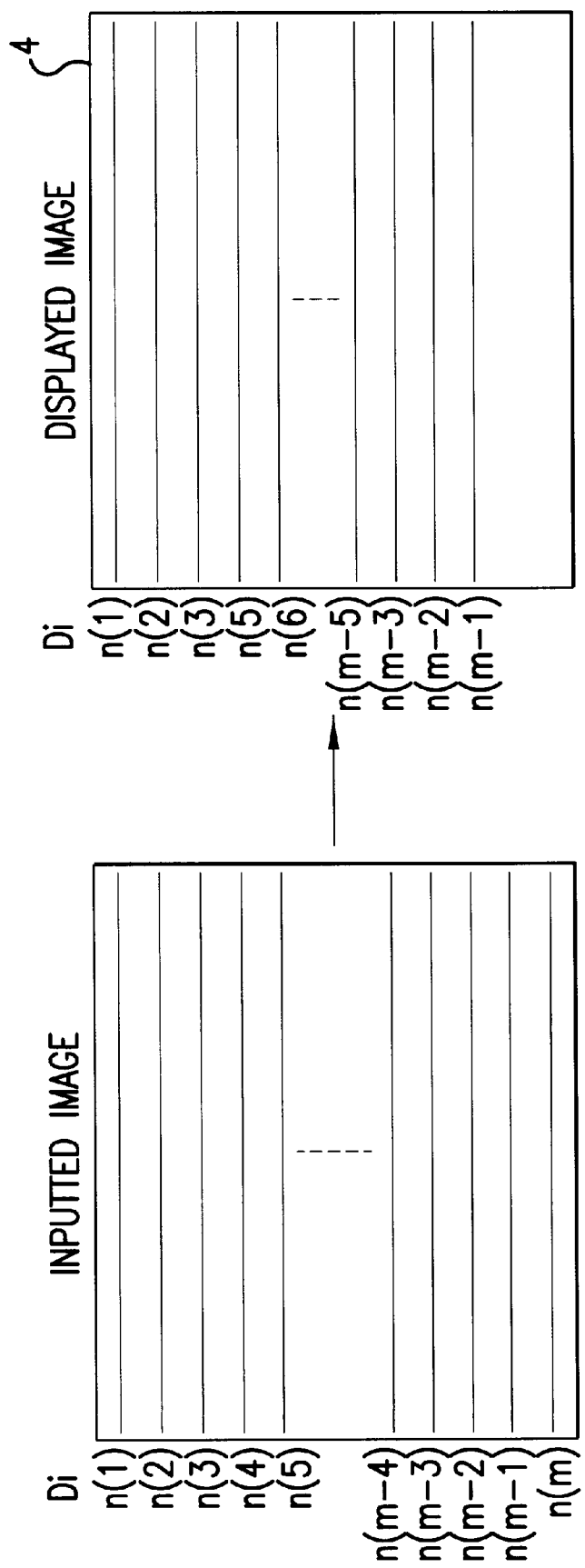
FIG. 5 is a diagram showing an image displaying method according to the first embodiment.
Figure 6:
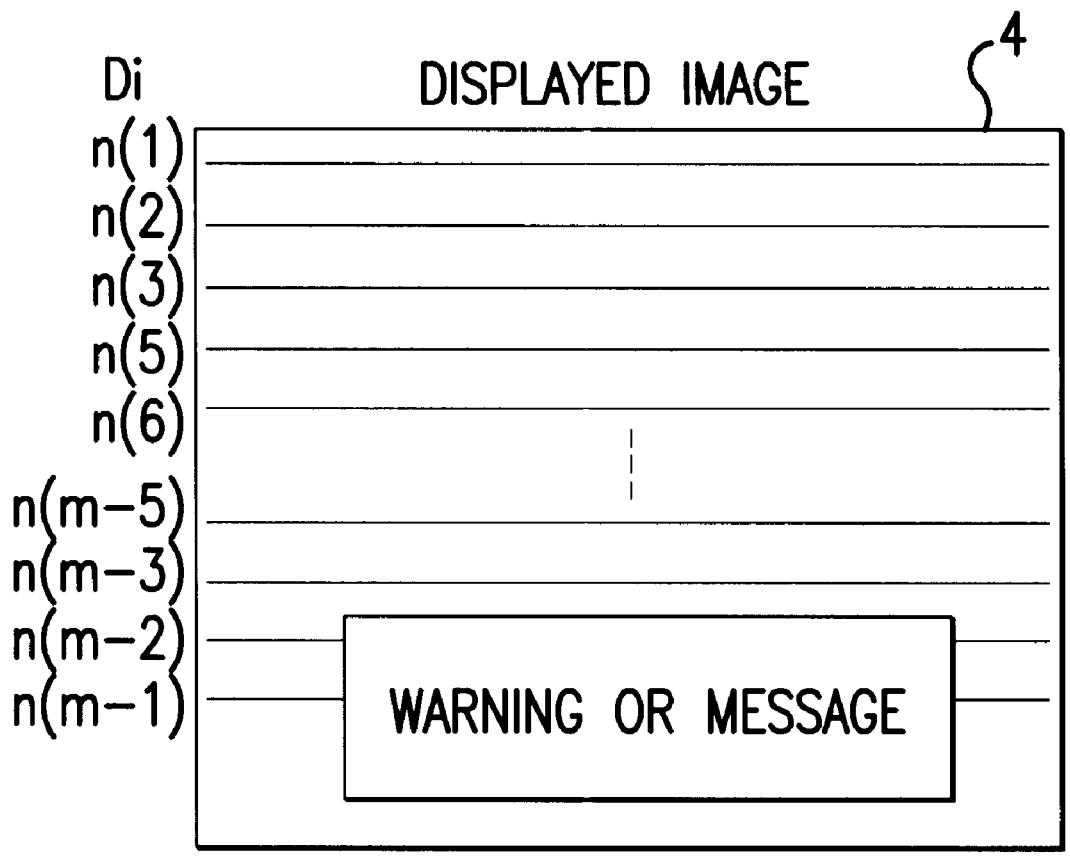
FIG. 6 is a diagram showing the image displaying method of the first embodiment.

FIGS. 5 and 6 are diagrams showing an image displaying method of the first embodiment. Line numbers in FIGS. 5 and 6 correspond to the line numbers shown in FIG. 4.

Next, the operation of the device will be explained.

The horizontal synchronizing signal HD is inputted to the horizontal synchronizing signal inputting terminal 5 and the vertical synchronizing signal VD is inputted to the vertical synchronizing signal inputting terminal 6. Meanwhile, an image signal composed of three primary colors of R, G and B for example is inputted to the image signal inputting terminal 1.

It is noted that the inputted image signal is synchronized with the horizontal synchronizing signal HD and the vertical synchronizing signal VD.

The horizontal synchronizing signal HD is inputted to the synchronizing signal processing circuit 7 and the clock generator 9 and the vertical synchronizing signal VD is inputted to the synchronizing signal processing circuit 7.

The synchronizing signal processing circuit 7 implements a predetermined reducing process on the inputted horizontal synchronizing signal HD and vertical synchronizing signal VD and outputs the horizontal synchronizing signal HS and the vertical synchronizing signal VS which have undergone the reducing process to the image signal processing circuit 3 and the driving circuit 10. The detailed operation of the reducing process in the synchronizing signal processing circuit 7 will be described later.

The clock generator 9 generates the clock CK having a predetermined frequency based on the inputted horizontal synchronizing signal HD. The clock CK generated by the clock generator 9 is inputted to the A/D converter 2, the image signal processing circuit 3 and the driving circuit 10.

Based on the inputted clock CK, the A/D converter 2 samples the inputted image signal to convert into a digital image signal Di. The digital image data Di converted by the A/D converter 2 is inputted to the image signal processing circuit 3. The image signal processing circuit 3 implements a predetermined process on the inputted digital image data Di based on the horizontal synchronizing signal HS and the vertical synchronizing signal VS processed by the synchronizing signal processing circuit 7.

Based on the horizontal synchronizing signal HS and the vertical synchronizing signal VS which have undergone the reducing process of the synchronizing signal processing circuit 7 and a control signal TD outputted from the controller 8, the driving circuit 10 generates the signal DS for driving the display panel 4.

The driving signal DS generated by the driving circuit 10 is inputted to the image signal processing circuit 3 and the display panel 4. Based on the driving signal DS, the image signal processing circuit 3 outputs the processed image data Dp to the display panel 4. The display panel 4 displays the image data Dp outputted from the image signal processing circuit 3 based on the driving signal DS outputted from the driving circuit 10.

Next, the operation of the synchronizing signal processing circuit 7 will be explained based on FIG. 3.

The horizontal synchronizing signal HD inputted from the horizontal synchronizing signal inputting terminal 5 and the vertical synchronizing signal VD inputted from the vertical synchronizing signal inputting terminal 6 are inputted to the frequency counter 11 and the synchronizing signal reducing circuit 12.

The frequency counter 11 counts the frequency of the inputted horizontal synchronizing signal HD and the vertical synchronizing signal VD and outputs the measured result RD to the controller 8.

The controller 8 discriminates the type of the inputted image signal from the measured result RD outputted from the frequency counter 11.

That is, the controller 8 determines whether or not the inputted image signal is an image signal having a horizontal synchronizing signal whose frequency is higher than a preset frequency based on the measured result RD. When the horizontal frequency of synchronizing signal of the inputted image signal is higher than the frequency set in advance, or more specifically when the image cannot be displayed on the display panel 4 correctly because one line of the display panel 4 cannot be processed during a period of one line of the inputted image signal, the controller 8 outputs the control signal TD to the synchronizing signal reducing circuit 12 and the driving circuit 10 so as to reduce the synchronizing signal at a predetermined rate.

Next, the operation of the synchronizing signal reducing circuit 12 and the image signal processing circuit 3 will be explained based on FIG. 4.

The synchronizing signal reducing circuit 12 performs the process for reducing the synchronizing signal at the predetermined rate by the control signal TD outputted from the controller 8 and outputs the horizontal synchronizing signal HS and the vertical synchronizing signal VS which have undergone the reducing process.

FIG. 4 shows a case when the control signal TD is inputted from the controller 8 to the synchronizing signal reducing circuit 12 so as to reduce the horizontal synchronizing signal HD by one line per four lines and when the synchronizing signal reducing circuit 12 implements the reducing process of the horizontal synchronizing signal HD based on the control signal TD to output the horizontal synchronizing signal HS when horizontal frequency of synchronizing signal of the inputted image signal is about $4/3$ times of the preset frequency for example. It is noted that the vertical synchronizing signal VS is not reduced in this example.

Based on the modified horizontal synchronizing signal HS which has undergone the reducing process, the image signal processing circuit 3 outputs to the display panel 4 the image data Dp which is a reduced data picked up in correspondence with the modified signal HS from the original image data Di. Therefore, image data n(4) and n(m) of the reduced line are not displayed on the display panel 4.

Thus, according to the present embodiment, the horizontal synchronizing signal HD and the image data Di are reduced to $3/4$ when the horizontal frequency of synchronizing signal of the inputted image signal is about $4/3$ times of the preset frequency and in the same time, the horizontal synchronizing signal HS and the image data Dp after the reducing process are outputted to the display panel 4 with the frequency of $3/4$ times of that at the time of input. Therefore, an image may be displayed on the display panel 4 while reducing the inputted image signal even when the horizontal frequency of the inputted horizontal synchronizing signal HD is higher than the preset frequency.

That is, the viewer can readily confirm what type of image signal is being inputted even when the image signal whose horizontal (or vertical) frequency is higher than the preset frequency is inputted.

Accordingly, it becomes possible to return the frequency to one before the change while watching the screen or to reset to the frequency or less which allows to display on the display panel 4.

FIGS. 5 and 6 are diagrams showing one example of the image displaying method of the first embodiment. More specifically, they show images displayed on the display panel 4 when the synchronizing signal reducing circuit 12 and the image signal processing circuit 3 reduce the number of lines of the inputted horizontal synchronizing signal HD and the image data Di to $3/4$ as shown in FIG. 4.

The line numbers shown in Di and Dp in FIGS. 5 and 6 correspond to the line numbers in FIG. 4.

It is noted that while the processes of reducing the horizontal synchronizing signal HD to $3/4$ by the synchronizing signal reducing circuit 12 and reducing the number of lines of the image signal to $3/4$ by the image signal processing circuit 3 have been explained in the above explanation of the operation, the invention is not confined to such a rate and the rate may be arbitrary set corresponding to the relationship between the type of the inputted image signal and the display panel 4.

Further, although the case of displaying the image data Dp from the first line of the display panel 4 has been shown in FIG. 5, the invention is not limited to such a case and the image display device can be made from an arbitrary line number.

It is also possible to notify the user to change the type of the inputted image signal by displaying a warning indicating that the horizontal frequency of synchronizing signal of the inputted image signal is higher than the upper limit of the preset frequency which allows to display on the display panel 4 or a message urging to change the horizontal frequency of synchronizing signal of the inputted image signal on part of the display panel 4 as shown in FIG. 6.

Second Embodiment

Figure 7:
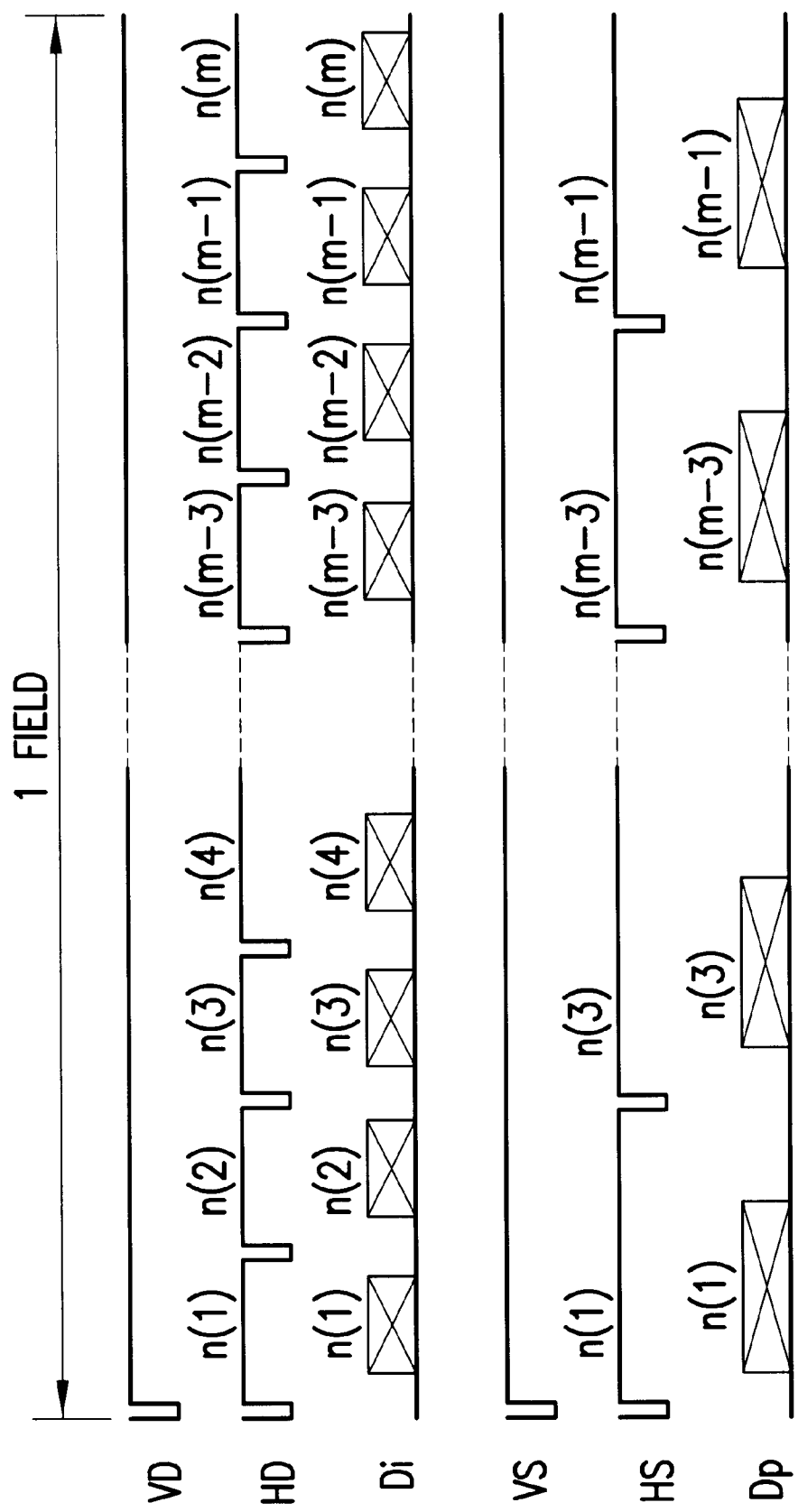
FIG. 7 is a chart for explaining a process for reducing a synchronizing signal and image signal according to a second embodiment.

FIG. 7 is a chart showing operations of the synchronizing signal reducing circuit 12 and the image signal processing circuit 3 according to a second embodiment of the invention. It is noted that because the operations other than the process for reducing the synchronizing signal and the image signal are the same with those in the first embodiment, their detailed explanation will be omitted here.

The synchronizing signal reducing circuit 12 reduces the horizontal synchronizing signal HD by removing its portions corresponding to one line per every two lines based on the control signal TD outputted from the controller 8 and outputs the horizontal synchronizing signal HS after the reducing process.

At this time, the synchronizing signal reducing circuit 12 does not implement a process for reducing the vertical synchronizing signal VS. The image signal processing circuit 3 outputs to the display panel 4 the image data Dp which is a reduced data picked up in correspondence with the modified signal HS from the original image data Di.

FIG. 7 shows a case when even lines are reduced from the horizontal synchronizing signal HD and the image data Di.

Because the horizontal synchronizing signal HS after the reducing process and the image data Dp after the reducing process are composed of only the odd lines, no data of the even lines of the inputted image signal is displayed on the display panel 4.

Thus, according to the present embodiment, the horizontal synchronizing signal HD and the image data Di are reduced to ½ when the horizontal frequency of synchronizing signal of the inputted image signal is higher than the preset frequency and in the same time, the horizontal synchronizing signal HS and the image data Dp after the reducing process are outputted on the display panel 4 with the frequency of ½ times of that at the time of input. Therefore, an image from which a partial image of the inputted image signal has been reduced may be displayed on the display panel 4 even when the horizontal frequency of synchronizing signal of the inputted image signal is higher than the preset frequency and the inputted image signal cannot be displayed.

Accordingly, it becomes possible to return the frequency to one before the change while watching the screen or to reset to the frequency or less which allows to display on the display panel 4.

Figure 8:
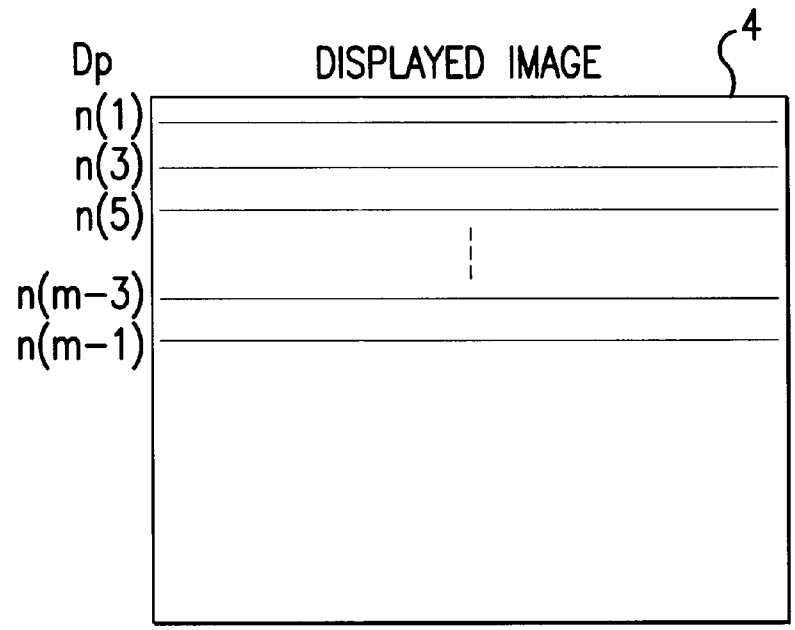
FIG. 8 is a diagram showing an image displaying method according to the second embodiment.

FIG. 8 is a diagram showing an image displaying method according to the second embodiment. Only the odd lines of the inputted image signal are displayed on the upper half part of the display panel 4 by reducing the horizontal synchronizing signal HD of the even lines and the image data Di of the even lines, by the synchronizing signal reducing circuit 12 and the image signal processing circuit 3, respectively.

It is noted that although the case of removing the even lines from the horizontal synchronizing signal HD by the synchronizing signal reducing circuit 12 has been shown in the above explanation of the operation, the even lines of the inputted image signal may be displayed on the display panel 4 by removing the odd lines of the horizontal synchronizing signal HD.

Further, although the case of displaying the image data Dp on the upper half part of the display panel 4 has been shown in FIG. 8, it may be displayed from an arbitrary line number.

Figure 9:
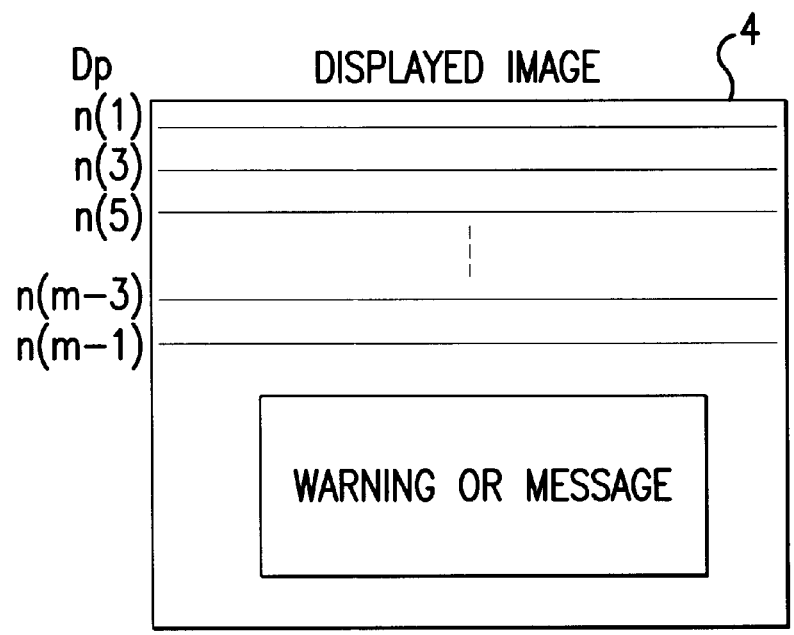
FIG. 9 is a diagram showing the image displaying method of the second embodiment.

FIG. 9 is a diagram showing another example of the image displaying method of the second embodiment.

It is possible to notify the user to change the type of the inputted image signal by displaying a warning indicating that the horizontal frequency of synchronizing signal of the inputted image signal is higher than the upper limit of the preset frequency which allows to display on the display panel 4 or a message urging to change the horizontal frequency of synchronizing signal of the inputted image signal on part of the display panel 4 while displaying the image data Dp on the area of a half of the display panel 4 as shown in FIG. 9.

Third Embodiment

Figure 10:
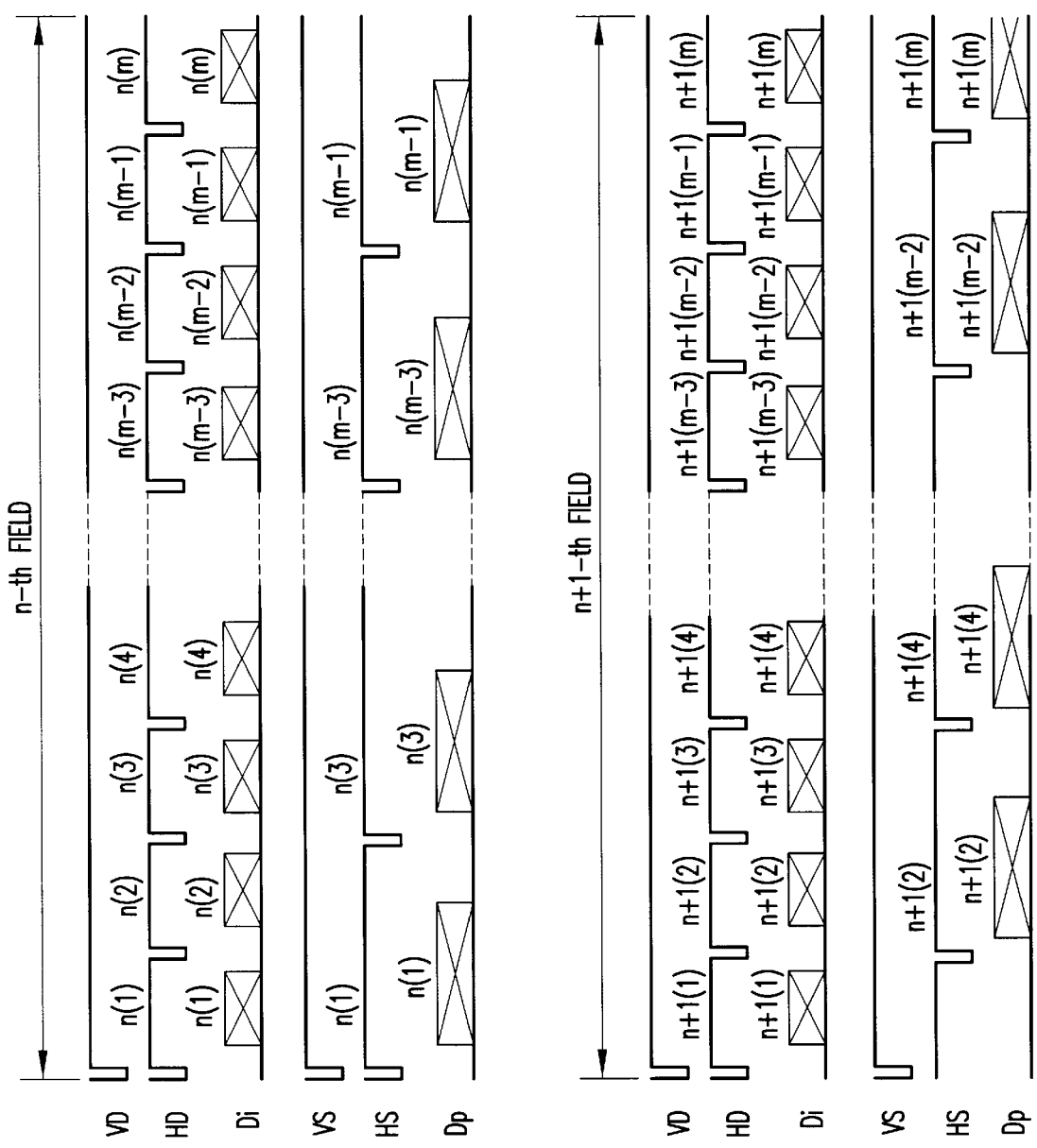
FIG. 10 is a chart for explaining a process for reducing a synchronizing signal and an image signal according to a third embodiment.

FIG. 10 is a chart for explaining operations of the synchronizing signal reducing circuit 12 and the image signal processing circuit 3 according to a third embodiment of the invention. It is noted that because the operations other than the processes for reducing the synchronizing signal and the image signal are the same with those in the first embodiment, their detailed explanation will be omitted here.

The synchronizing signal reducing circuit 12 removes even lines of the n-th field and odd lines of the n+1-th field of the horizontal synchronizing signal HD based on the control signal TD outputted from the controller 8 and outputs the horizontal synchronizing signal HS after the reducing process.

At this time, the synchronizing signal reducing circuit 12 does not implement the process for reducing the vertical synchronizing signal VS. The image signal processing circuit 3 outputs to the display panel 4 the image data Dp which is a reduced data picked up in correspondence with the modified signal HS from the original image data Di, i.e., the even lines of the n-th field and the odd lines of the n+1-th field are removed by the image signal processing circuit 3.

FIG. 10 shows a case when the even lines of the n-th field and the odd lines of the n+1-th field are reduced from the horizontal synchronizing signal HD and the image data Di.

Because the horizontal synchronizing signal HS after the reducing process and the image data Dp after the reducing process of the n-th field are composed of the odd lines and the horizontal synchronizing signal HS after the reducing process and the image data Dp after the reducing process of the n+1-th field are composed of the even lines, no image data of the even lines of the n-th field and of the odd lines of the n+1-th field is displayed on the display panel 4.

Thus, according to the present embodiment, the horizontal synchronizing signal HD and the image data Di are reduced to ½ when the horizontal frequency of synchronizing signal of the inputted image signal is higher than the preset frequency and in the same time, the horizontal synchronizing signal HS and the image data Dp after the reducing process are outputted on the display panel 4 with the frequency of ½ times. Therefore, the image of the inputted image signal which has been reduced partly may be displayed on the display panel 4 even when the horizontal frequency of synchronizing signal of the inputted image signal is higher than the preset frequency.

Accordingly, it becomes possible to return the frequency to one before the change while watching the screen or to reset to the frequency or less which allows to display on the display panel 4.

It also brings about an effect when the inputted image is still that all information can be displayed with a rate of ½ in the direction of a time axis.

Figure 11:
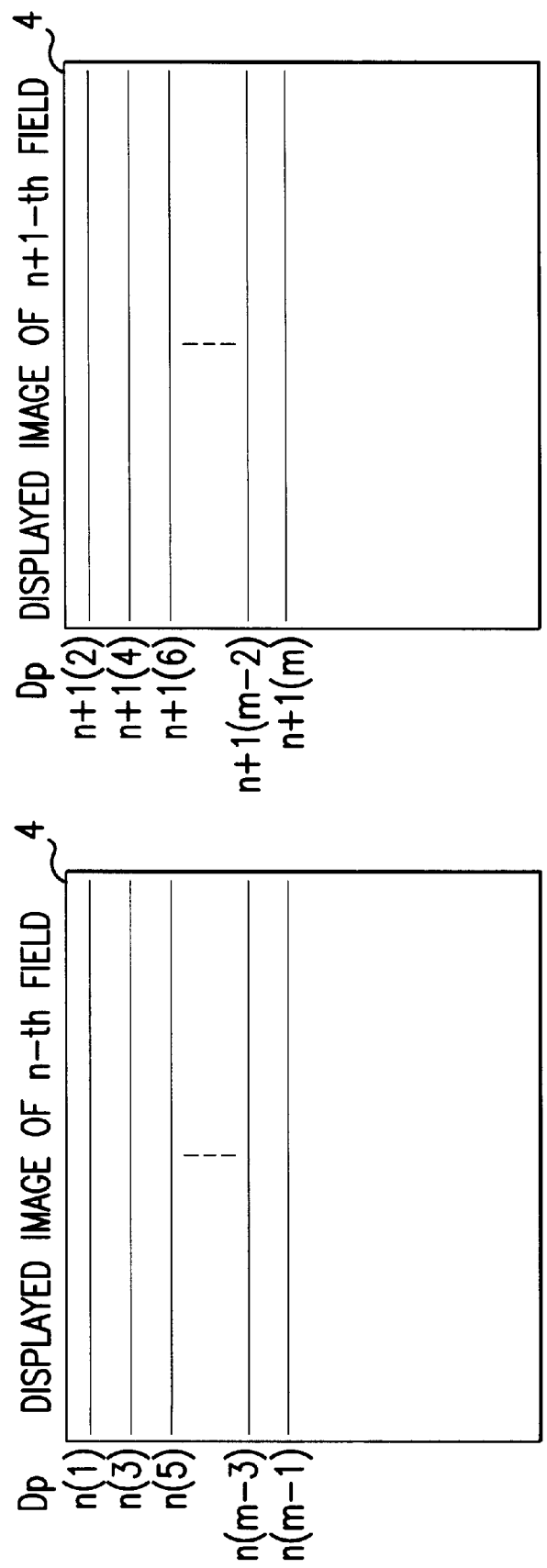
FIG. 11 is a diagram showing an image displaying method according to the third embodiment.

FIG. 11 is a diagram showing an image displaying method according to the third embodiment. Because the synchronizing signal reducing circuit 12 removes the even lines of the n-th field and the odd lines of the n+1-th field, the odd lines of the inputted image signal are displayed on part of the display panel 4 in the n-th field and the even lines of the inputted image signal are displayed on part of the display panel 4 in the n+1-th field.

It is noted that although the case of displaying the image data Dp on the upper half part of the display panel 4 has been shown in FIG. 11, the invention is not confined to such a case and it may be displayed from an arbitrary line number.

Figure 12:
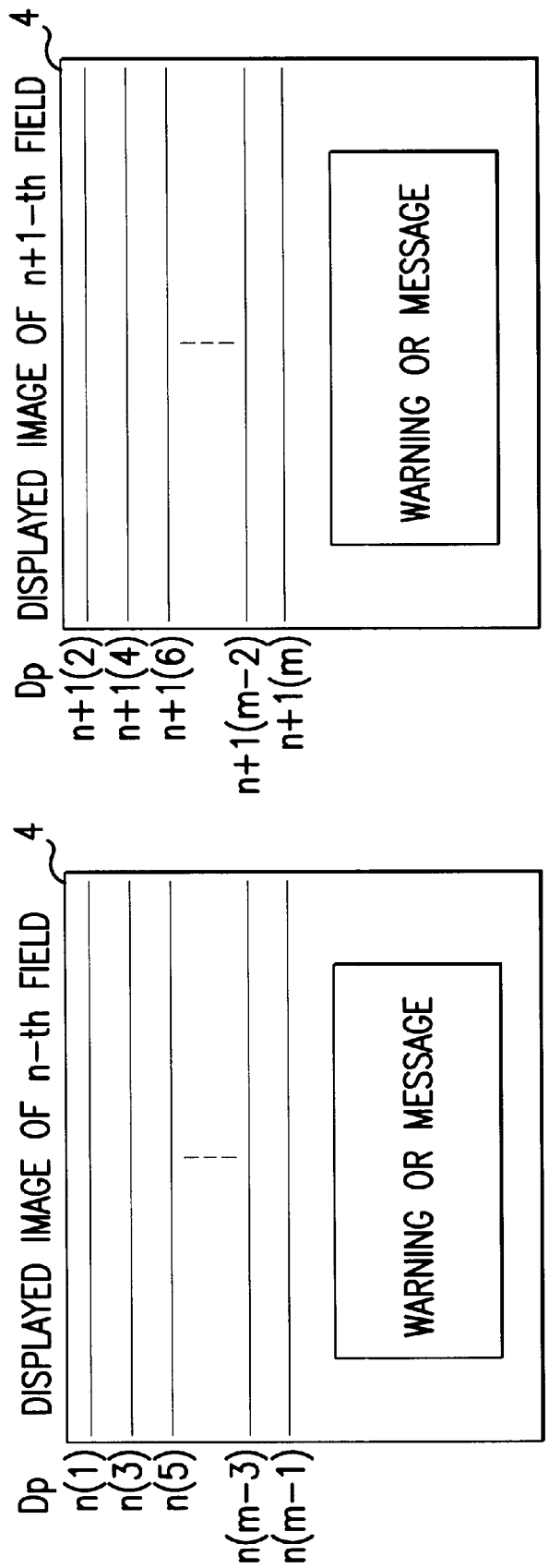
FIG. 12 is a diagram showing the image displaying method of the third embodiment.

FIG. 12 is a diagram showing another example of the image displaying method of the third embodiment.

It is possible to notify the user to change the type of the inputted image signal by displaying a warning indicating that the horizontal frequency of synchronizing signal of the inputted image signal is higher than the upper limit of the preset frequency which allows to display on the display panel 4 or a message urging to change the horizontal frequency of synchronizing signal of the inputted image signal on part of the display panel 4 while displaying the image data Dp on the area of a half of the display panel 4 as shown in FIG. 12.

Fourth Embodiment

Figure 13:
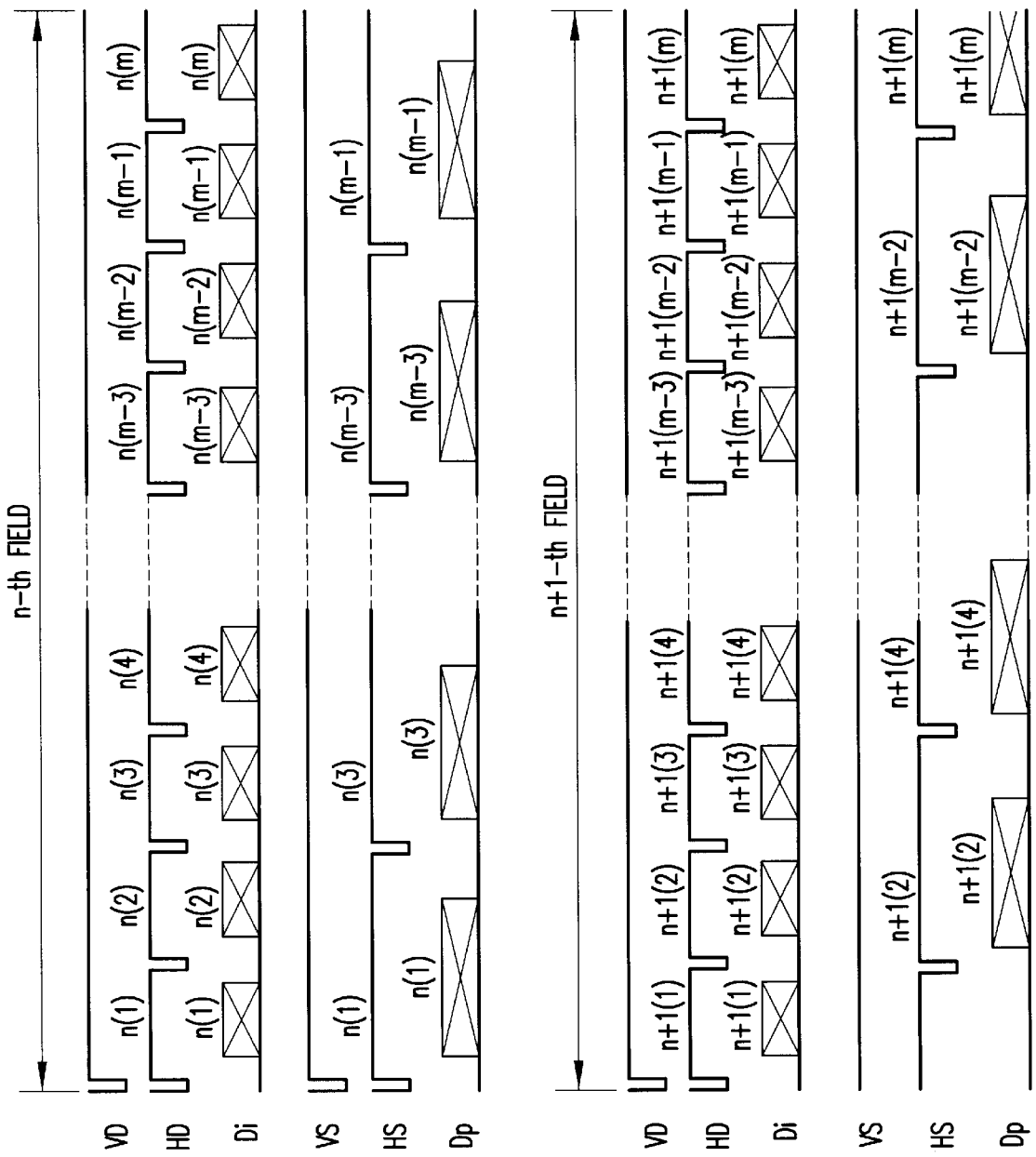
FIG. 13 is a chart for explaining a process for reducing a synchronizing signal and an image signal according to a fourth embodiment.

FIG. 13 is a chart for explaining operations of the synchronizing signal reducing circuit 12 and the image signal processing circuit 3 according to a fourth embodiment of the invention. It is noted that the operations other than the process for reducing the synchronizing signal and the image signal are the same with those in the first embodiment, so that their detailed explanation will be omitted here.

The synchronizing signal reducing circuit 12 reduces horizontal synchronizing signal corresponding to even lines of the n-th field and odd lines of the n+1-th field from the inputted horizontal synchronizing signal HD based on the control signal TD outputted from the controller 8 and outputs the horizontal synchronizing signal HS after the reducing process. In the same time, it also reduces the n+1-th field from the inputted vertical synchronizing signal VD and outputs the vertical synchronizing signal VS after the reducing process.

The image signal processing circuit 3 also reduces the image data Di of the same line with the line from which the horizontal synchronizing signal has been reduced, i.e., the even lines of the n-th field and the odd lines of the n+1-th field, and outputs the image data Dp on the display panel 4 after the reducing process.

FIG. 13 shows a case of reducing the horizontal synchronizing signal HD and the image data Di corresponding to the even lines in the n-th field and of reducing the horizontal synchronizing signal HD, the image data Di corresponding to the odd lines in the n+1-th field and the vertical synchronizing signal VD.

Because the horizontal synchronizing signal HS of the n-th field after the reducing process and the image data Dp after the reducing process are composed of the odd lines and the horizontal synchronizing signal HS of the n+1-th field after the reducing process and the image data Dp after the reducing process are composed of the even lines, no image data of the even lines of the n-th field and of the odd lines of the n+1-th field is displayed on the display panel 4.

Thus, according to the present embodiment, the horizontal synchronizing signal HD and the image data Di are reduced to ½ when the horizontal frequency of synchronizing signal of the inputted image signal is higher than the preset frequency and in the same time, the horizontal synchronizing signal HS and the image data Dp after the reducing process are outputted on the display panel 4 with the frequency of ½ times. Therefore, the image of the inputted image signal which has been reduced partly may be displayed on the display panel 4 even when the horizontal frequency of synchronizing signal of the inputted image signal is higher than the preset frequency.

Accordingly, it becomes possible to return the frequency to one before the change while watching the screen or to reset to the frequency or less which allows to display on the display panel 4.

It also brings about an effect that all information can be displayed without causing flickers even when the images of the even lines and of the odd lines are different.

Figure 14:
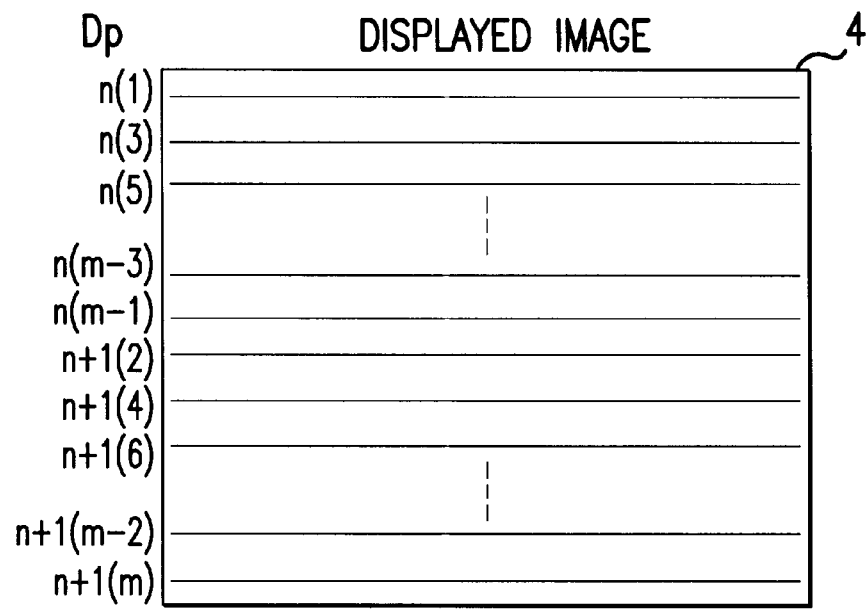
FIG. 14 is a diagram showing an image displaying method according to the fourth embodiment.

FIG. 14 is a diagram showing an image displaying method according to the fourth embodiment. Because the synchronizing signal reducing circuit 12 removes the even lines of the n-th field and the odd lines of the n+1-th field from the inputted horizontal synchronizing signal HD and the image data Di and the n+1-th field from the inputted vertical synchronizing signal VD, the odd lines of the n-th field are displayed on the upper half part of the display panel 4 and the even lines of the n+1-th field are displayed on the lower half part of the display panel 4.

Figure 15:
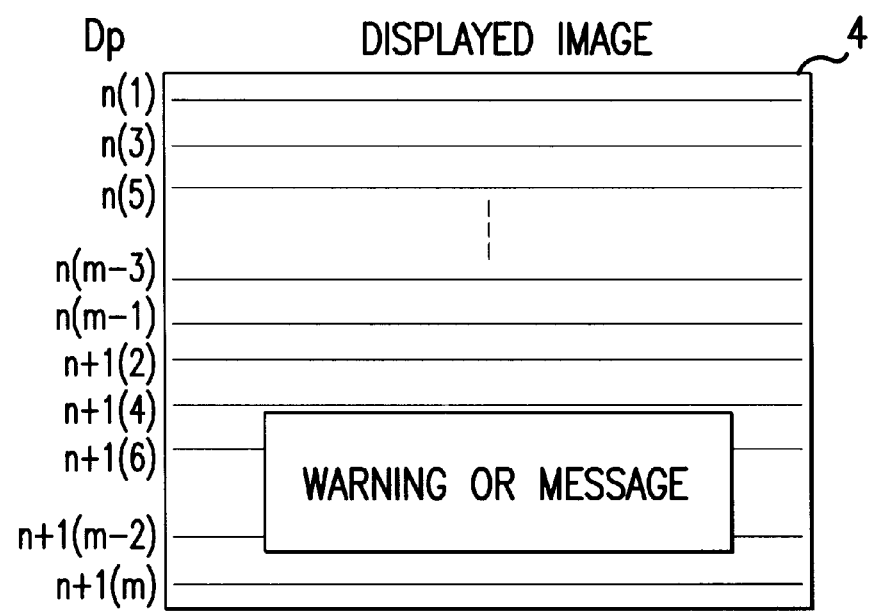
FIG. 15 is a diagram showing the image displaying method of the fourth embodiment.

FIG. 15 is a diagram showing another example of the image displaying method of the fourth embodiment.

It is possible to notify the user to change the type of the inputted image signal by displaying a warning indicating that the horizontal frequency of synchronizing signal of the inputted image signal is higher than the upper limit of the preset frequency which allows to display on the display panel 4 or a message urging to change the horizontal frequency of synchronizing signal of the inputted image signal on part of the display panel 4 while displaying the data of the odd lines of the n-th field on the upper half part of the display panel 4 and displaying the data of the even lines of the n+1-th field on the lower half part of the display panel 4, as shown in FIG. 15.

Fifth Embodiment

Figure 16:
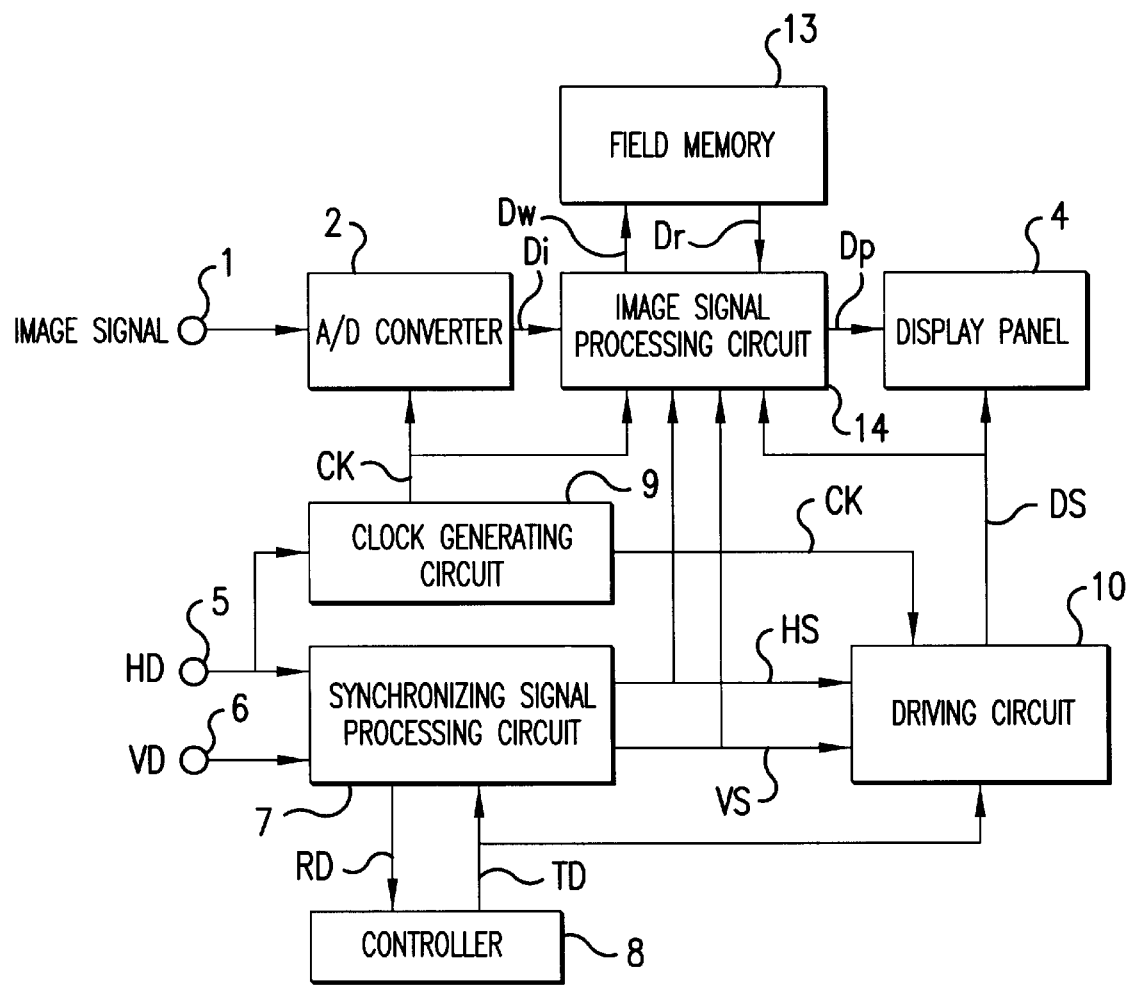
FIG. 16 is a diagram showing the structure of an image display device according a fifth embodiment.

FIG. 16 is a diagram showing the structure of an image display device according a fifth embodiment of the invention.

In FIG. 16, the reference numeral (13) denotes a field memory for temporarily storing image data of at least one field, (14) an image signal processing circuit, (Dw) image data stored in the field memory 13 and (Dr) image data read from the field memory 13.

Next, the operation of the device will be explained.

The horizontal synchronizing signal HD is inputted to the horizontal synchronizing signal inputting terminal 5 and the vertical synchronizing signal VD is inputted to the vertical synchronizing signal inputting terminal 6. Meanwhile, an image signal composed of three primary colors of R, G and B for example is inputted to the image signal inputting terminal 1.

It is noted that the inputted image signal is synchronized with the horizontal synchronizing signal HD and the vertical synchronizing signal VD. The horizontal synchronizing signal HD is inputted to the synchronizing signal processing circuit 7 and the clock generator 9 and the vertical synchronizing signal VD is inputted to the synchronizing signal processing circuit 7.

The synchronizing signal processing circuit 7 implements a predetermined reducing process on the horizontal synchronizing signal HD and vertical synchronizing signal VD and outputs the horizontal synchronizing signal HS and the vertical synchronizing signal VS which have undergone the reducing process to the image signal processing circuit 14 and the driving circuit 10. The detailed operation of the reducing process in the synchronizing signal processing circuit 7 will be described later.

The clock generator 9 generates the clock CK having a predetermined frequency based on the inputted horizontal synchronizing signal HD. The clock CK generated by the clock generator 9 is inputted to the A/D converter 2, the image signal processing circuit 14 and the driving circuit 10.

Based on the inputted clock CK, the A/D converter 2 samples the inputted image signal to convert into digital image signal Di. The digital image data Di converted by the A/D converter 2 is inputted to the image signal processing circuit 14. The image signal processing circuit 14 implements a predetermined process on the inputted digital image data Di based on the horizontal synchronizing signal HS and the vertical synchronizing signal VS processed by the synchronizing signal processing circuit 7. In addition to that, the image signal processing circuit 14 stores the image data to the field memory 13 and reads image data Dr already stored from the field memory 13. Based on the horizontal synchronizing signal HS and the vertical synchronizing signal VS which have undergone the reducing process of the synchronizing signal processing circuit 7 and a control signal TD outputted from the controller 8, the driving circuit 10 generates the driving signal DS of the display panel 4.

The driving signal DS generated by the driving circuit 10 is inputted to the image signal processing circuit 14 and the display panel 4. Based on the driving signal DS, the image signal processing circuit 14 implements a predetermined process on the image data Dr read from the field memory 13 and outputs the processed image data Dp on the display panel 4. The display panel 4 displays the image data Dp outputted from the image signal processing circuit 14 based on the driving signal DS outputted by the driving circuit 10.

Next, the operation of the synchronizing signal processing circuit 7 will be explained based on FIG. 3.

The horizontal synchronizing signal HD inputted from the horizontal synchronizing signal inputting terminal 5 and the vertical synchronizing signal VD inputted from the vertical synchronizing signal inputting terminal 6 are inputted to the frequency counter 11 and the synchronizing signal reducing circuit 12.

The frequency counter 11 counts the frequency of the inputted horizontal synchronizing signal HD and the vertical synchronizing signal VD and outputs the measured result RD to the controller 8.

The controller 8 discriminates the type of the inputted image signal based on the measured result RD outputted from the frequency counter 11. The controller 8 outputs the control signal TD for reducing the horizontal synchronizing signal HD at the predetermined rate to the synchronizing signal reducing circuit 12 and the driving circuit 10 when the horizontal frequency of synchronizing signal of the inputted image signal is higher than the preset frequency or more specifically when the image cannot be displayed on the display panel 4 correctly or when image data cannot be written to the field memory 13 because one line cannot be processed during a period of one line of the inputted image signal.

The synchronizing signal reducing circuit 12 implements the process for reducing the synchronizing signal at the predetermined rate based on the control signal TD outputted from the controller 8 and outputs the horizontal synchronizing signal HS and the vertical synchronizing signal VS after the reducing process.

Figure 17:
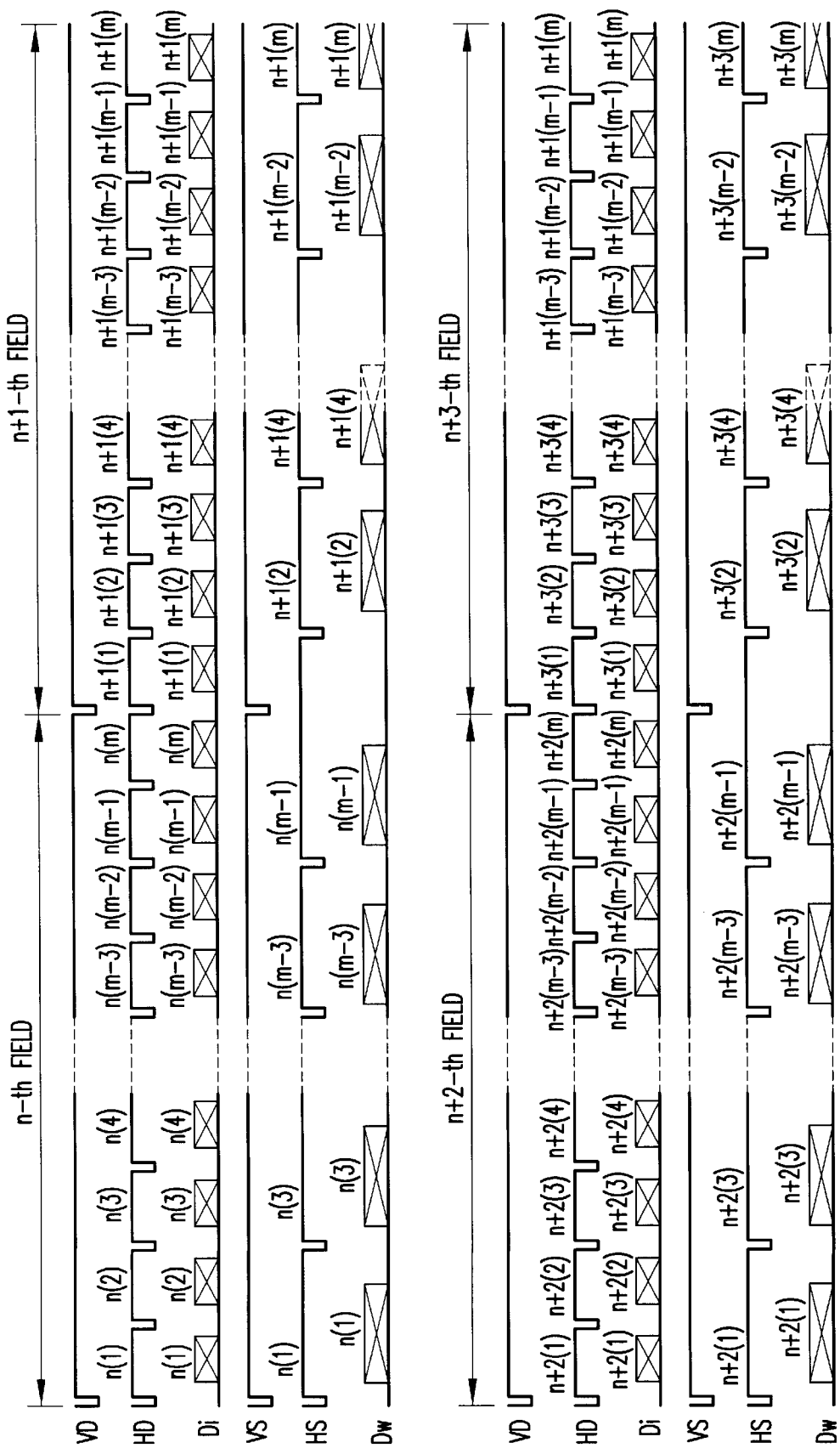
FIG. 17 is a chart for explaining a process for reducing a synchronizing signal and an image signal according to the fifth embodiment.

Next, the operation of the synchronizing signal reducing circuit 12 and the image signal processing circuit 14 will be explained based on FIG. 17.

As described above, the synchronizing signal reducing circuit 12 implements the process for reducing the inputted horizontal synchronizing signal HD by removing the even lines of the n-th field and the n+2-th field and the odd lines of the n+1-th field and the n+3-th field based on the control signal TD outputted from the controller 8 and outputs the horizontal synchronizing signal HS after the reducing process.

Based on the modified horizontal synchronizing signal HS after the reducing process, the image signal processing circuit 14 reduces image data Di, i.e. the even lines of the n-th field and the n+2-th field and the odd lines of the n+1-th field and the n+3-th field are removed by the image signal processing circuit 14. Then, it stores the image data Dw of the odd lines in an area of the field memory 13 for storing data of the odd lines in the n-th field and the n+2-th field and stores the image data Dw of the even lines in an area of the field memory 13 for storing data of the even lines in the n+1-th field and the n+3-th field.

It is noted that when the image signal processing circuit 14 reads out data of the field memory 13, the image data Dp in which the image data of the odd lines and even lines are composed is outputted on the display panel 4 by alternately reading the data of the even lines and odd lines in predetermined order.

Thus, the horizontal frequency of synchronizing signal of the inputted image signal is reduced to ½ when the horizontal frequency of synchronizing signal of the inputted image is higher than the preset frequency and in the same time, the horizontal synchronizing signal HS and the image data Dw after the reducing process are processed at the frequency of ½, so that which a part of the inputted image signal which has been reduced may be displayed on the display panel 4 even when the horizontal frequency of synchronizing signal of the inputted image signal is higher than the preset frequency.

That is, it becomes possible to return the frequency to one before the change while watching the screen or to reset to the frequency or less which allows to display on the display panel 4.

It is noted that the present embodiment allows the upper limit of the horizontal frequency which can be accommodated to be increased because it is not necessary to reduce the inputted horizontal synchronizing signal until the horizontal frequency which can be accommodated by the field memory 13, when the upper limit of the horizontal frequency with which data can be written to the field memory 13 is higher than the upper limit of the horizontal frequency which can be accommodated by the display panel 4 by a synchronously controlling the writing and reading of the image signal to/from the field memory 13.

It also brings about the effect that when the inputted image signal is still, an image equivalent to an image not reduced may be displayed on the display panel 4.

Figure 18:
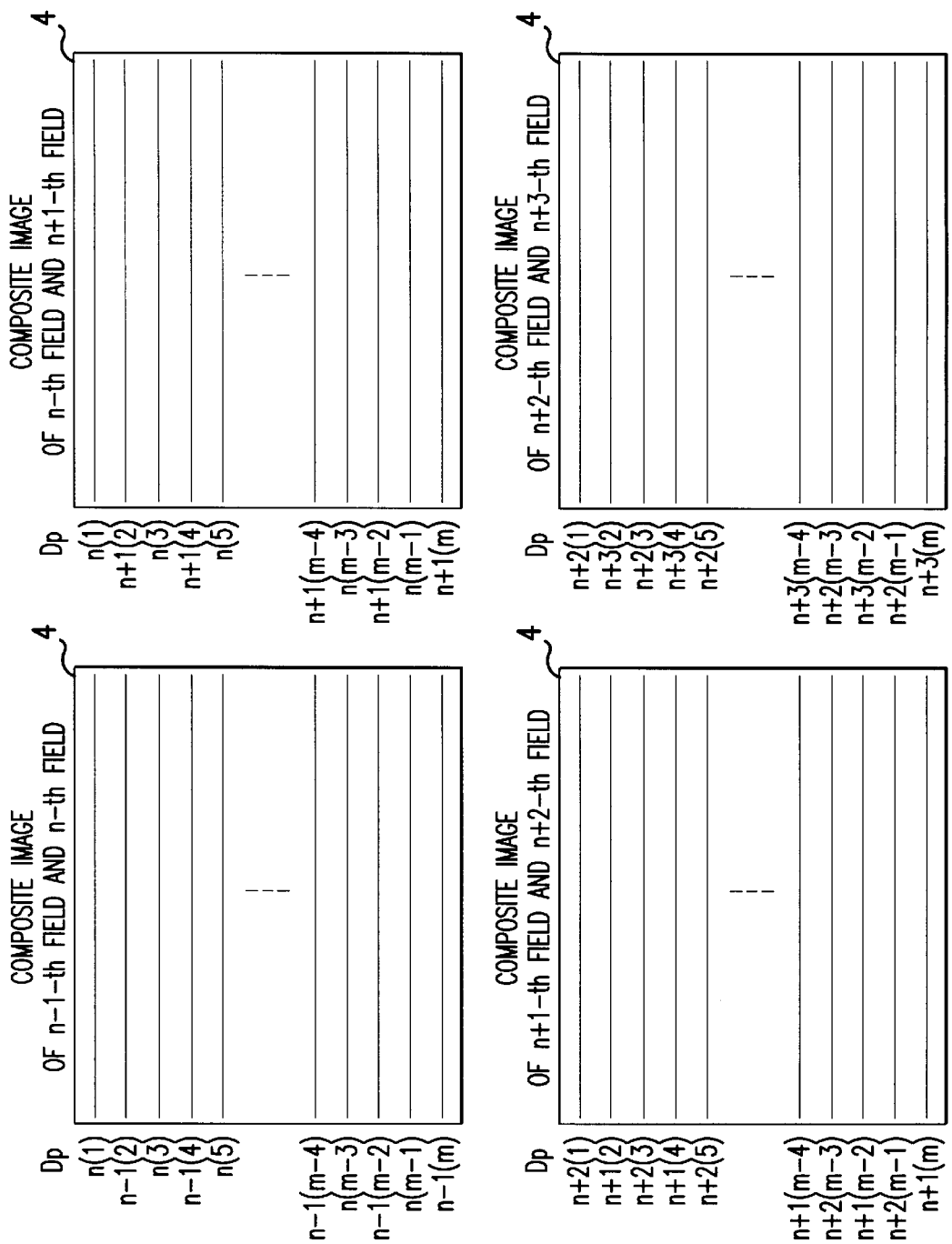
FIG. 18 is a diagram showing an image displaying method according to the fifth embodiment.

FIG. 18 is a diagram showing one example of the image displaying method of the fifth embodiment. More specifically, it shows images displayed on the display panel 4 in a period of four fields when the synchronizing signal reducing circuit 12 implements the synchronizing signal process shown in FIG. 17.

An image in which the even lines of the n−1-th field and the odd lines of the n-th field are composed, an image in which the odd lines of the n-th field and the even lines of the n+1-th field are composed, an image in which the even lines of the n+1-th field and the odd lines of the n+2-th field are composed and an image in which the odd lines of the n+2-th field and the even lines of the n+3-th field are composed are displayed sequentially on the display panel 4.

Figure 19:
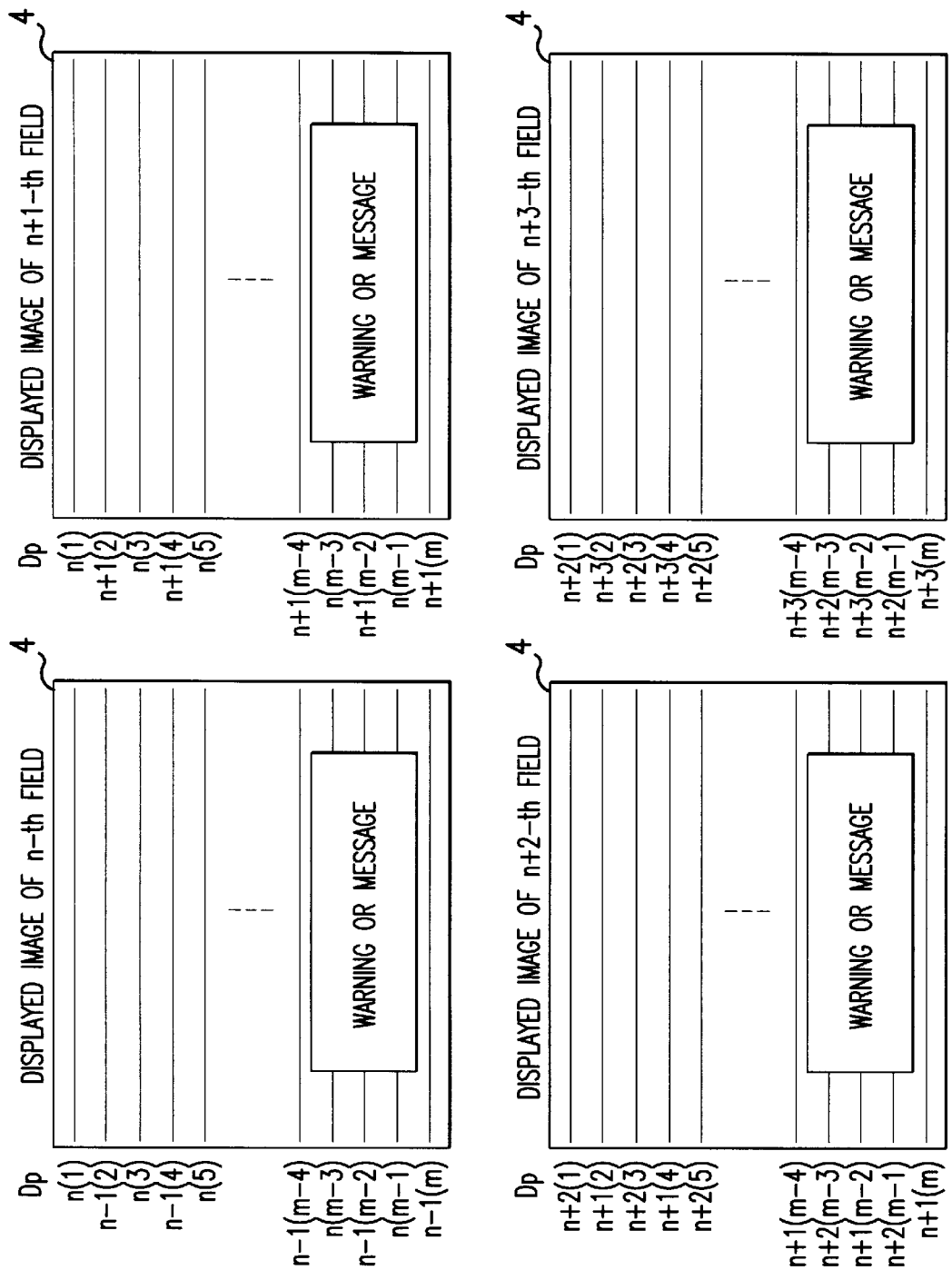
FIG. 19 is a diagram showing the image displaying method of the fifth embodiment.

FIG. 19 is a diagram showing another example of the image displaying method of the fifth embodiment.

It is possible to notify the user to change the type of the inputted image signal by displaying a warning indicating that the horizontal frequency of synchronizing signal of the inputted image signal is higher than the upper limit of the preset frequency which allows to display on the display panel 4 or a message urging to change the horizontal frequency of synchronizing signal of the inputted image signal on part of the display panel 4 while composing and displaying image data of the odd lines and even lines of the different fields on the display panel 4 as shown in FIG. 19.

The invention has been described with respect to certain preferred embodiments. Various modifications and additions within the spirit of the invention will occur to those skilled in the art. Accordingly, the scope of the invention is limited solely by the following claims.

What is claimed is:

1. An image display device, comprising:
   a clock generator for generating clock having a frequency and phase based on a synchronizing signal of an image signal;
   an A/D converter for sampling said image signal with said clock to convert into a digital image signal;
   synchronizing frequency discriminating means for discriminating whether or not said synchronizing signal has a frequency higher than a preset frequency;
   synchronizing signal processing means for reducing said synchronizing signal based on the discrimination result of said synchronizing frequency discriminating means and outputting a modified synchronizing signal;
   image signal processing means for reducing said digital image signal on the basis of said modified synchronizing signal to output a reduced signal image signal; and
   a display unit displaying an image corresponding to said reduced digital image signal outputted from said image signal processing means.

2. The image display device according to claim 1, wherein said synchronizing signal comprises a horizontal synchronizing signal which corresponds to odd and even lines for displaying said digital image signal, and said synchronizing signal processing means reduces said horizontal synchronizing signal by removing its portions corresponding to either one of odd or even lines.

3. The image display device according to claim 1, wherein said synchronizing signal comprises a vertical synchronizing signal which corresponds to a plurality of fields and a horizontal synchronizing signal which corresponds to odd and even lines for displaying said digital image signal, and said synchronizing signal processing means reduces said horizontal synchronizing signal by removing its portions corresponding to either one of odd or even lines in an n-th field (n is a positive integer) and the other one of the odd or even lines in an n+1-th field.

4. The image display device according to claim 3, wherein said synchronizing signal processing means reduces said vertical synchronizing signal by removing its portions corresponding to the n+1-th field.

5. The image display device according to claim 1, wherein said synchronizing signal comprises a vertical synchronizing signal which corresponds to a plurality of fields and a horizontal synchronizing signal which corresponds to odd and even lines for displaying said digital image signal, and said synchronizing signal processing means reduces said horizontal synchronizing signal by removing its portions corresponding to the even lines and the odd lines alternatively per field.

6. The image display device according to claim 5, wherein said synchronizing signal processing means reduces said vertical synchronizing signal by removing its portions corresponding to every other field.

7. The image display device according to claim 1, wherein said display unit displays a warning indicating that said image signal is not conforming to said display unit and/or a message for instructing to change the type of said image signal based on the discrimination result of said synchronizing frequency discriminating means.

8. An image display device, comprising:
   a clock generator for generating clock having a frequency and phase based on a synchronizing signal of an image signal;
   an A/D converter for sampling said image signal with said clock to convert into a digital image signal;
   synchronizing frequency discriminating means for discriminating whether or not said synchronizing signal has a frequency higher than a preset frequency;
   synchronizing signal processing means for reducing a horizontal synchronizing signal by removing its portions corresponding to either one of odd or even lines in an n-th field (n is a positive integer) and the other one of the odd or even lines is an n+1-th field based on the discrimination result of said synchronizing frequency discriminating means and outputting a modified synchronizing signal;
   a memory capable of storing data of at least one field of said digital image signal;
   image signal processing means for reducing said digital image signal on the basis of said modified synchronizing signal to write, into said memory, a reduced signal corresponding to the n-th field and reduced signal corresponding to the n+1-th field and for reading out said reduced signals stored in said memory in predetermined order of lines to combine said reduced signals to obtain a combined digital image signal, and for outputting said combined digital image signal; and
   a display unit for displaying an image corresponding to said combined digital image signal outputted from said image signal processing means.

9. The image display device according to claim 8, wherein said display unit displays a warning indicating that said image signal is not conforming to said display unit and/or a message for instructing to change the type of said image signal based on the discrimination result of said synchronizing frequency discriminating means.

10. An image displaying method for displaying an image on a display unit, comprising steps of:
    discriminating whether or not a synchronizing signal of an image signal has a frequency higher than a present frequency;

reducing said synchronizing signal based on the result of said discriminating step and outputting a modified synchronizing signal;

reducing said image signal based on said modified synchronizing signal to output a reduced image signal; and displaying an image corresponding to said reduced image signal on said display unit.

11. The image displaying method according to claim 10, wherein said image signal is reduced by removing either one of odd or even lines, in the step of reducing said image signal.

12. The image displaying method according to claim 10, wherein said image signal is reduced by removing either one of odd or even lines in an n-th field (n is a positive integer) and the other one of odd or even lines in an n+1-th field, respectively, in the step of reducing said image signal.

13. The image displaying method according to claim 12, wherein an image corresponding to said reduced image signal is displayed per every field, in the step of displaying on said display unit.

14. The image displaying method according to claim 12, wherein an image corresponding to said reduced image signal of the n-th field is displayed on a part of said display unit and an image corresponding to said reduced image signal of the n+1-th field is displayed on the remaining part of said display unit, in the step of displaying on said display unit.

15. The image displaying method according to claim 12, wherein an image corresponding to said reduced image signal of which even lines are removed is displayed on odd lines of said display unit and an image corresponding to said reduced image signal of which odd lines are removed is displayed on even lines of said display unit, in the step of displaying on said display unit.

16. The image displaying method according to claim 10, wherein said image signal is reduced by removing even lines and odd lines alternately per every field, in the step of reducing said image signal.

17. The image displaying method according to claim 16, wherein an image corresponding to said reduced image signal is displayed per every field, in the step of displaying on said display unit.

18. The image displaying method according to claim 16, wherein an image corresponding to said reduced image signal of two consecutive fields is displayed at one time, in the step of displaying on said display unit.

19. The image displaying method according to claim 16, wherein an image corresponding to said reduced image signal of which even lines are removed is displayed on odd lines of said display unit and an image corresponding to said reduced image signal of which odd lines are removed is displayed on even lines of said display unit, in the step of displaying on said display unit.

20. The image displaying method according to claim 10, wherein a warning indicating that said image signal is not conforming to said display unit and/or a message for instructing to change the type of said image signal are/is displayed based on said discrimination result, in the step of displaying on said display unit.

* * * * *